United States Patent
Wakabayashi

(10) Patent No.: US 8,246,246 B2
(45) Date of Patent: Aug. 21, 2012

(54) TEMPERATURE SENSOR MOUNTING UNIT

(75) Inventor: Yasuki Wakabayashi, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 518 days.

(21) Appl. No.: 12/585,496

(22) Filed: Sep. 16, 2009

(65) Prior Publication Data

US 2010/0067562 A1 Mar. 18, 2010

(30) Foreign Application Priority Data

Sep. 17, 2008 (JP) .................................. 2008-237582

(51) Int. Cl.
*G01K 1/14* (2006.01)
(52) U.S. Cl. ........ 374/208; 374/100; 374/194; 374/163; 374/183; 374/179; 374/141; 73/866.5; 320/150
(58) Field of Classification Search .................. 374/141, 374/163, 208, 179, 183, 185, 100, 153, 152, 374/194; 73/866.5; 320/150; 340/500, 503, 340/508, 750.01, 76.11; 702/57, 60, 58, 702/59, 61, 62, 63, 64, 108, 130
See application file for complete search history.

(56) References Cited

U.S. PATENT DOCUMENTS

| | | | | | |
|---|---|---|---|---|---|
| 5,686,675 | A | * | 11/1997 | Barton | 73/866.5 |
| 6,142,297 | A | * | 11/2000 | Price | 206/212 |
| 2008/0277159 | A1 | * | 11/2008 | Liepold | 174/480 |

FOREIGN PATENT DOCUMENTS

JP 2006-250763 9/2006

* cited by examiner

*Primary Examiner* — Gail Verbitsky
(74) *Attorney, Agent, or Firm* — McGinn IP Law Group, PLLC

(57) ABSTRACT

According to an aspect of the present invention, there is provided a temperature sensor mounting unit for mounting a temperature sensor inside a mounting-target member through a mounting hole provided in a mounting wall, the temperature sensor mounting unit including: a base plate; elastic gripping pieces that extend from the base plate to grip the temperature sensor therebetween; elastic locking pieces formed on the base plate to be brought into engagement with the mounting hole; and a passage hole formed on the base plate to lead out a lead wire therethrough, wherein, in a mounted state, at least when an external force to expand the elastic gripping pieces is exerted, the elastic gripping pieces are brought into abutment with an inner circumference of the mounting hole so as to be prevented from expanding.

6 Claims, 4 Drawing Sheets

TEMPERATURE SENSOR MOUNTING UNIT

CROSS-REFERENCE TO RELATED APPLICATIONS

This application claims priority from Japanese Patent Application No. 2008-237582 filed on Sep. 17, 2008, the entire contents of which are incorporated herein by reference.

BACKGROUND OF THE INVENTION

1. Field of the Invention

An aspect of the present invention relates to a temperature sensor mounting unit for mounting, for example, a temperature sensor for measuring an internal temperature in a battery of an electric vehicle or a temperature of a coolant for an internal combustion engine.

2. Description of the Related Art

In recent years, because of environmental issues, much attention is drawn to electric vehicles which employ electric motors as drive sources and hybrid vehicles which employ an internal combustion engine and electric motors as drive sources. In these types of vehicles, a battery is required to supply electric power to the electric motors.

When the internal temperature of the battery increases, there may be a case where the output of the electric motors is affected. Because of this, a temperature sensor for measuring the internal temperature of the battery may be mounted on an exterior casing of the battery. A temperature sensor may be used to measure the temperature of a coolant for an internal combustion engine or to measure the temperature of outside air.

JP-2006-250763-A discloses a temperature sensor which includes a pressure-welded terminal having a pressure-welded portion connected to a sheath-removed internal conductor of a wiring harness and a connecting portion formed integrally with the pressure-welded portion, a temperature detecting element whose lead wire is connected to the connecting portion, a housing in which an element accommodating portion for accommodating the temperature detecting element and a terminal holding portion for holding the pressure-welded terminal are formed, and a hot-melt resin which is charged in the element accommodating portion and inside the circumferential wall in such a state that the temperature detecting element is accommodated in the element accommodating portion and the pressure-welded terminal is held by the terminal holding portion of the housing.

An anchor-type clip is formed outside the housing, and by the clip being inserted into a mounting hole provided in a mounting-target member where the temperature sensor is to be mounted, the clip is brought into engagement with the mounting hole, whereby the temperature sensor is mounted on the mounting-target member.

In JP-2006-250763-A, the temperature detecting element is fixed by charging the hot-melt resin in the element accommodating portion of the housing after the temperature detecting element has been accommodated therein. Although the temperature detecting element is fixed relatively firmly within the housing by the use of the hot-melt resin, since the step of charging the hot-melt resin is necessary, the mounting work becomes complex and troublesome and takes much time. As a result, the mounting work of the temperature sensor has been regarded as being inefficient.

SUMMARY OF THE INVENTION

One of objects of the invention is to provide a temperature sensor mounting unit which can hold a temperature sensor firmly and increase the efficiency of mounting work of the temperature sensor.

According to an aspect of the present invention, there is provided a temperature sensor mounting unit for mounting a temperature sensor inside a mounting-target member through a mounting hole provided in a mounting wall, the temperature sensor mounting unit including: a base plate that is to be mounted on the mounting hole from a front side of the mounting wall; a plurality of elastic gripping pieces that extend from the base plate to grip the temperature sensor therebetween and to be inserted into the mounting hole; a plurality of elastic locking pieces formed on the base plate to be brought into engagement with the mounting hole form a back side of the mounting wall; and a passage hole formed on the base plate to lead out a lead wire of the temperature sensor therethrough, wherein, in a state where the elastic locking pieces has been engaged with the mounting hole and where the elastic gripping pieces are inserted into the mounting hole, at least when an external force to expand the elastic gripping pieces is exerted, the elastic gripping pieces are brought into abutment with an inner circumference of the mounting hole so as to be prevented from expanding.

According to above configuration, the lead wire of the temperature sensor is drawn out of the passage hole in the base plate, and the temperature sensor is inserted between the plurality of elastic gripping pieces, whereby the temperature sensor is gripped by the plurality of elastic gripping pieces, and the temperature sensor can be held on a rear surface side of the base plate. Further, the base plate on which the temperature sensor is held is pushed into the mounting hole, and the plurality of elastic locking pieces are brought into engagement with the circumferential edge on the rear side of the mounting hole, whereby the temperature sensor can be mounted in the mounting hole.

As this occurs, the plurality of elastic gripping pieces are inserted into the mounting hole, and when the external force is exerted on the elastic gripping pieces, attempting to expand the elastic gripping pieces, the outer surfaces of the elastic gripping pieces which lie in the direction in which the elastic gripping pieces deform are brought into abutment with the inner circumference of the mounting hole, whereby the expansion of the elastic gripping pieces is restricted. Therefore, even though the external force is given to the temperature sensor by, for example, the lead wire being pulled, the temperature sensor can be firmly held between the elastic gripping pieces of which the deformation is so restricted.

In addition, the temperature sensor does not have to be secured to the base plate with a resin, and the temperature sensor can be mounted in the mounting hole simply by pushing the temperature sensor into the mounting hole after the temperature sensor has been gripped by the elastic gripping pieces. As a result, the efficiency of the temperature sensor mounting work can be increased.

According to another aspect of the present invention, there may be provided the temperature sensor mounting unit, wherein the temperature sensor has a rod shape, and wherein the elastic gripping pieces are arranged in two rows each aligned in an extending direction of the rod-shaped temperature sensor.

According to above configuration, since the rod-shaped temperature sensor is gripped by the elastic gripping pieces which are disposed in two rows on both the sides of the temperature sensor along the longitudinal direction thereof, the temperature sensor can be held more firmly.

According to still another aspect of the present invention, there may be provided the temperature sensor mounting unit, wherein the two rows of the elastic gripping pieces are arranged in zigzag along the extending direction of the rod-shaped temperature sensor.

According to above configuration, since the plurality of elastic gripping pieces are disposed in the rows on both the sides of the temperature sensor along the longitudinal direction thereof in such a manner as to be arranged in a zigzag fashion so as not to face the elastic gripping pieces on the opposite row, the temperature sensor is gripped between the elastic gripping pieces so that the gripping force by the elastic gripping pieces is not concentrated to a given portion of the temperature sensor but is dispersed thereover, whereby the breakage of the temperature sensor can be prevented.

According to still another aspect of the present invention, there may be provided the temperature sensor mounting unit, wherein the base plate has a plate shape extending along the extending direction of the rod-shaped temperature sensor, wherein a pair of support walls are provided at both ends of the base plate in an extending direction thereof to have a width matching to the mounting hole, and wherein the elastic locking pieces are provided on the base plate via the support walls, respectively.

According to above configuration, since the elastic locking pieces are brought into engagement with the circumferential edge on the rear side of the mounting hole in such a state that the pair of support walls erected from the base plate at both longitudinal ends thereof are inserted in both longitudinal end portions of the mounting hole, the temperature sensor can be mounted in the mounting hole without the looseness.

According to still another aspect of the present invention, there may be provided the temperature sensor mounting unit, wherein a plurality of guide pieces are provided on the base plate at an opposite side of the elastic gripping pieces, and wherein the guide pieces guide the lead wire that has been lead out through the passage hole in a given direction.

According to above configuration, since the lead wire of the temperature sensor can be kept guided in the given direction by the guide pieces when the temperature sensor is attempted to be held on the rear surface side of the base plate, the lead wire can be prevented from interfering with other members residing around the mounting hole when the base plate is pushed into the mounting hole so as to mount the temperature sensor therein, thereby enhancing the efficiency of temperature sensor mounting work.

According to still another aspect of the present invention, there may be provided the temperature sensor mounting unit, wherein the guide pieces are arranged along the extending direction of the rod-shaped temperature sensor.

According to above configuration, since the guide pieces are disposed along the direction in which the elastic gripping pieces are disposed, the lead wire is oriented perpendicular to the elastic-gripping-pieces deforming direction. As a result, even though the temperature sensor is pulled via the lead wire before being mounted in the mounting hole, since the temperature sensor only moves in the direction perpendicular to the deforming direction of the elastic gripping pieces, the temperature sensor can be held in a stable posture.

DETAILED DESCRIPTION OF THE EMBODIMENTS

Hereinafter, referring to FIGS. 1 to 3B, a temperature sensor mounting unit according to an embodiment of the invention will be described.

Figure 1:
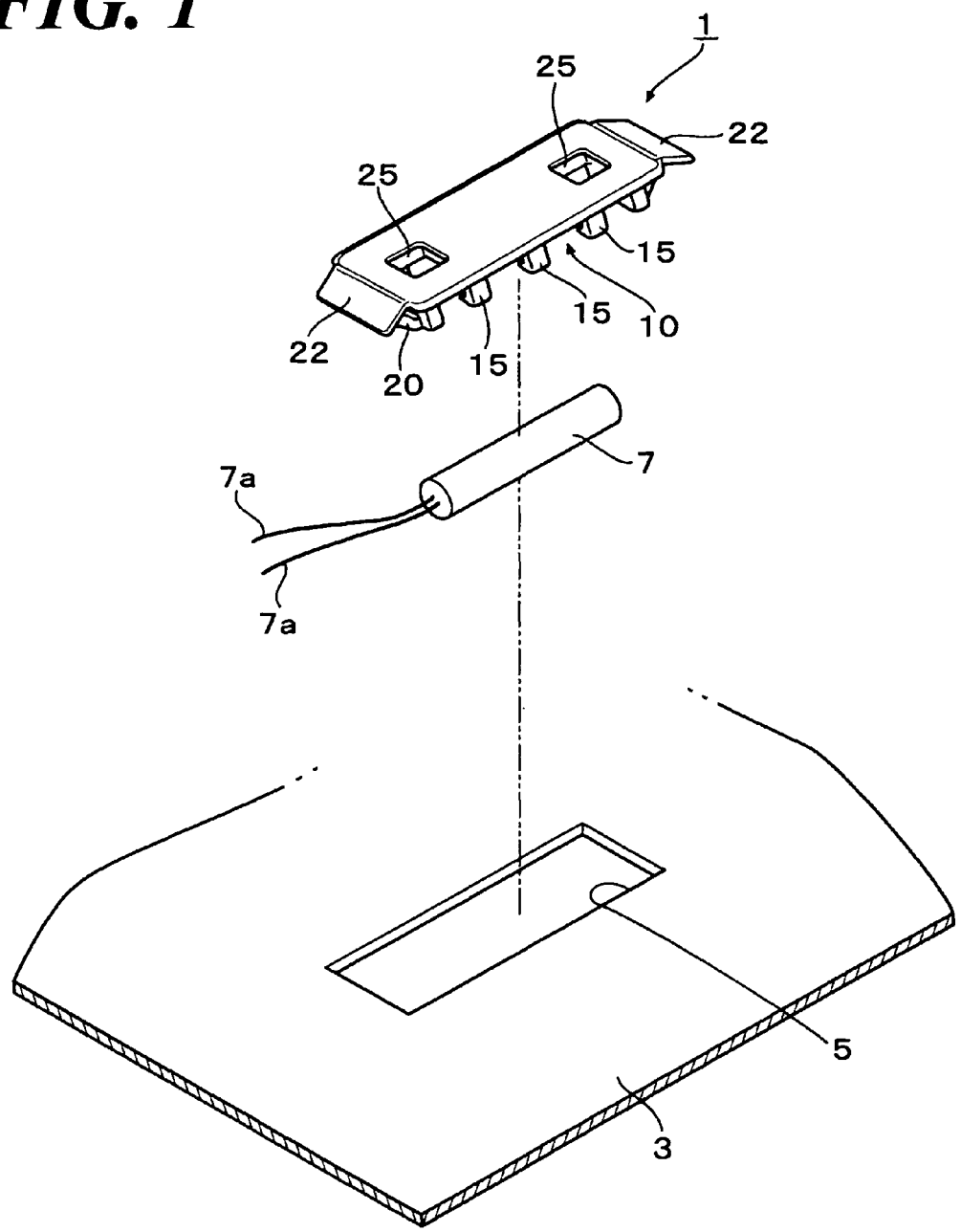
FIG. 1 is a perspective view showing a temperature sensor mounting unit according to an embodiment of the invention.

As is shown in FIG. 1, this temperature sensor mounting unit 1 (hereinafter, referred to as a "mounting unit 1") is used to mount a temperature sensor 7 including thermistor or thermocouple inside a mounting-target member (not shown) where the temperature sensor is to be mounted through a mounting hole 5 formed in a mounting wall 3 thereof. In this embodiment, the mounting wall 3 configures an outer casing of a battery (the mounting-target member) of an electric vehicle, and the rod-shaped temperature sensor 7 is mounted on the mounting wall 3 so as to measure an internal atmosphere of the battery. In this embodiment, the mounting hole 5 has an elongated hole shape elongated in one direction. The mounting hole may be a circular hole, a rectangular hole, or a square hole, and the shape of the mounting hole is selected appropriately correspondingly with the shape of a base plate 10, which will be described later.

Referring to FIGS. 2A to 3B, the mounting unit has a base plate 10 on which the temperature sensor 7 is held. The base plate 10 has a plurality of elastic gripping pieces 15 which grip to hold the temperature sensor 7, a plurality of elastic locking pieces 20 to be brought into engagement with a circumferential edge on a rear side of the mounting hole 5 and passage holes 25 which allow the lead wires 7a of the temperature sensor 7 passing therethrough.

The base plate 10 has a long plate shape which extends long along the rod-shaped temperature sensor 7. On a rear surface side of the base plate 10, a raised portion 12 is formed to have circumferential sides slightly narrower than that of the base plate 10 and to have a given height (refer to FIGS. 2B and 2C). On the raised portion 12, the plurality of elastic gripping pieces 15 are formed to extend therefrom. The plurality of elastic gripping pieces 15 are formed to be deformable to grip and hold the temperature sensor 7 therebetween.

In this embodiment, the plurality of elastic gripping pieces 15 are aligned in two rows on both sides of the rod-shaped temperature sensor 7 along a longitudinal direction thereof. And, the plurality of elastic gripping pieces 15 are arranged in zigzag along the longitudinal direction so as not to overlap each other transversely across the base plate 10 and so as not to face the elastic gripping pieces 15 on the opposite row. Three elastic gripping pieces 15 are arranged on one longitudinal side of the temperature sensor 7, and two elastic gripping pieces 15, 15 are arranged on the other longitudinal side of the temperature sensor 7 so that the two elastic gripping pieces 15 are arranged between the three elastic gripping pieces 15. At least two or more elastic gripping pieces 15 may be provided so as to grip the temperature sensor 7 therebetween, and there is no specific limitation on the arrangement thereof.

To facilitate the insertion into the mounting hole 5, a distal end portion of each elastic gripping piece 15 is formed to be slightly curved inwards, and a pressing claw 16 is provided thereon to project inwards. On each pressing claw 16, a distal end face 16a is formed into a tapered shape so as to be gradually reduced in height towards a distal end side, thereby enhancing the guiding properties of the elastic gripping piece 15 when the temperature sensor is inserted into the mounting hole 5. As is shown in FIG. 3B, as viewed from an axial direction of the temperature sensor 7, a minimum width W of the adjacent pressing claws 16, 16 (a space between top portions of the claws 16) is set smaller than an outside diameter D of the temperature sensor 7 to be gripped between the pressing claws 16.

When the rod-shaped temperature sensor 7 is inserted between the plurality of elastic gripping pieces 15, the pressing claws 16 are pressed by the temperature sensor 7 so that the elastic gripping pieces 15 are deformed outwards and is eventually gripped by the plurality of elastic gripping pieces 15. In this embodiment, the elastic gripping pieces 15 are formed to be deformable in a direction perpendicular to the axial direction of the rod-shaped temperature sensor 7.

Figure 3A:
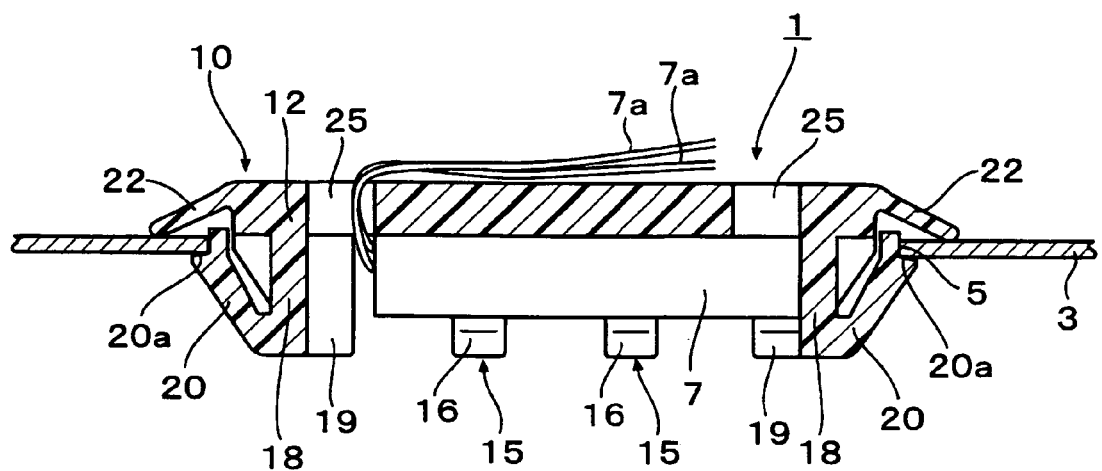
FIGS. 3A and 3B are drawings showing a state in which the temperature sensor is mounted on a mounting wall of a mounting-target member by the same mounting unit, FIG. 3A being a sectional view showing the same state, FIG. 3B being a sectional view taken along a sectional plane at right angles to FIG. 3A.
Figure 3B:
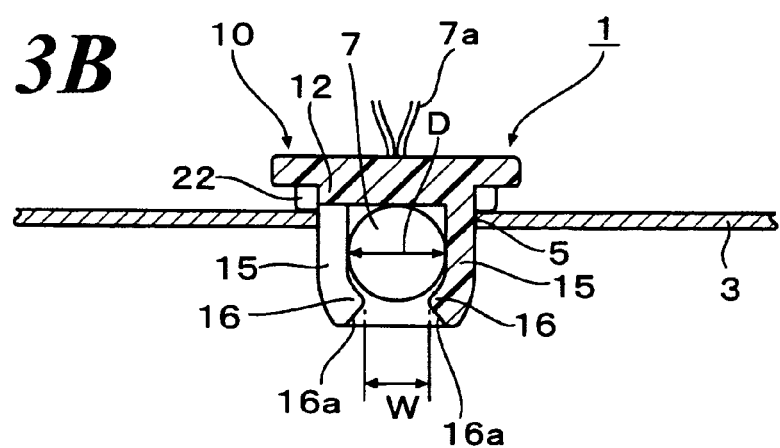

In the mounting unit 1 in this embodiment, when the plurality of elastic locking pieces 20 are brought into engagement with the circumferential edge on the rear side of the mounting hole 5, the plurality of elastic gripping pieces 15 are inserted into the mounting hole 5, and are brought into abutment with an inner circumference of the mounting hole 5 at outer surfaces in the deforming direction thereof (refer to FIG. 3B).

Figure 2A:
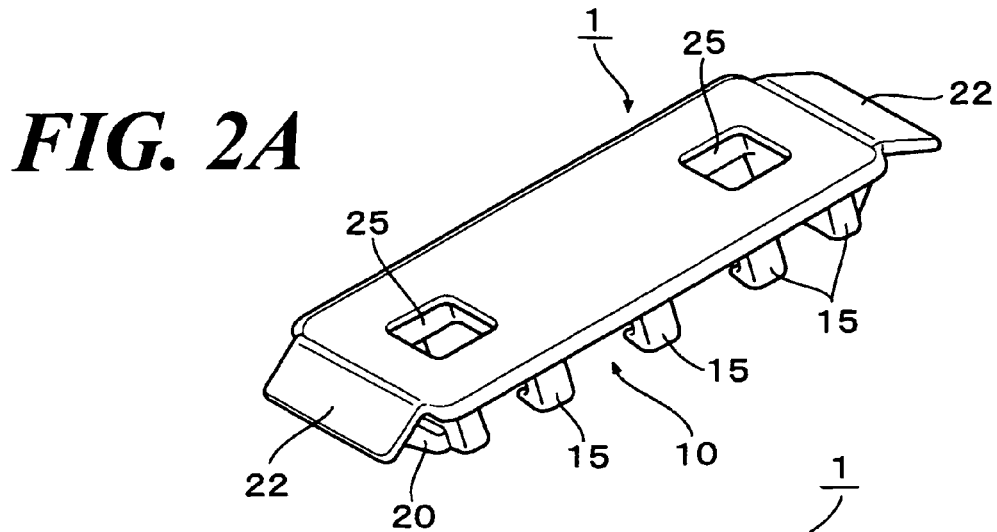
FIGS. 2A to 2C are drawings showing the same mounting unit, FIG. 2A being an enlarged perspective view thereof, FIG. 2B being an enlarged perspective view of the same mounting unit as viewed from an opposite side to FIG. 2A, FIG. 2C being an enlarged perspective view of the same mounting unit shown at FIG. 2B with a temperature sensor held thereon.
Figure 2B:
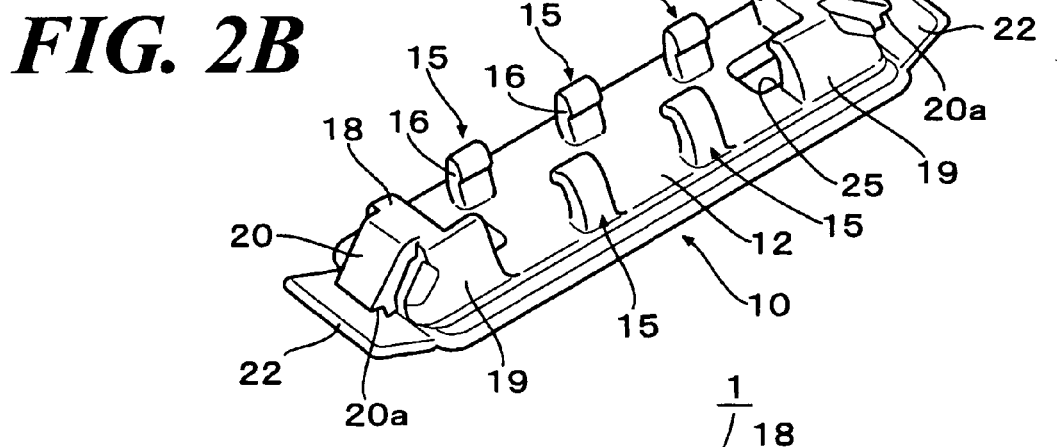
Figure 2C:
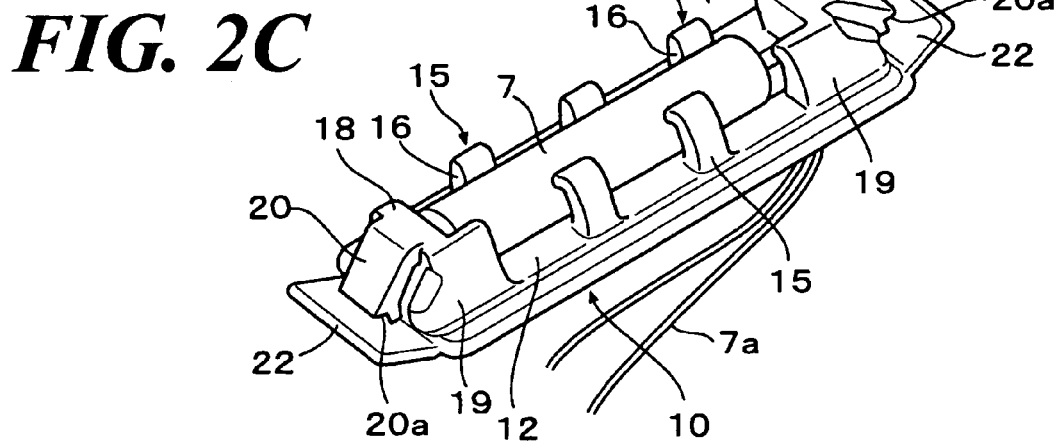

As is shown in FIGS. 2B and 2C, from a rear surface side of the long-plate shaped base plate 10, a pair of support walls 18, 18 are erected at both longitudinal ends (shorter sides) thereof to have a width which matches a width of the mounting hole 5 in a width direction (a direction perpendicular to the longitudinal direction of the elongated-hole shaped mounting hole 5). Further, ribs 19, 19 are erected from the rear surface side of the base plate 10. Each rib 19, 19 is connected to one end of each support wall 18, and the ribs 19, 19 are both disposed outsides the two elastic gripping portions 15, 15. While the support walls 18 come into abutment with the inner circumference of the mounting hole 5 at the longitudinal ends, the ribs 19 come into abutment with the inner circumference of the mounting hole 5 at one side along the longitudinal direction thereof.

From distal end portions of the support walls 18, respectively, deformable elastic locking pieces 20, 20 extend obliquely outwards towards the base plate 10. On outer sides of the distal ends of the elastic locking pieces 20, respectively, locking step portions 20a are formed so as to be brought into engagement with the circumferential edge on the rear side of the mounting hole 5 at both longitudinal ends.

At both longitudinal end edges of the base plate 10, respectively, pressing pieces 22, 22 are provided to extend obliquely outwards towards proximal end sides of the elastic locking pieces 20. Each pressing piece 22 is brought into elastic abutment with a circumferential edge on a front surface side of the mounting hole 5 when the elastic locking piece 20 is brought into engagement with the circumferential edge on the rear side of the mounting hole 5, so as to prevent the looseness of the mounting unit 1.

The quadrangular passage holes 25, 25 are respectively formed at both the longitudinal end portions of the base plate 10 in positions adjacent to insides of the pair of support walls 18, 18 so as to draw out the lead wires 7a of the temperature sensor 7 being gripped by the plurality of elastic gripping pieces 15 therethrough. The passage hole 25 may be a circular hole, an oval hole, a rectangular hole, or a square hole.

Next, how to use the mounting unit 1 according to the embodiment will be described below.

Firstly, the lead wires 7a of the temperature sensor 7 are drawn out to a front side of the base plate 10 from one of the passage holes 25 in the base plate 10, and then, as is shown in FIG. 1, the rod-shaped temperature sensor 7 is pushed in the plurality of elastic gripping pieces 15 while being laid horizontally.

Then, the temperature sensor 7 is introduced between the elastic gripping pieces 15 while being guided by the distal end faces 16a of the pressing claws 16. As this occurs, the pressing claws 16 are pressed against from inside, and the temperature sensor 7 continues to be pushed in while deforming the elastic gripping pieces 15 outwards. When the temperature sensor 7 rides over top portions of the pressing claws 16 to go into the inside of the plurality of elastic gripping pieces 15, the elastic gripping pieces 15 are elastically restored so as to grip the temperature sensor 7 therebetween, whereby the temperature sensor 7 is temporarily held on the rear surface side of the base plate 10.

In this state, the orientation of the base plate 10 is aligned with the mounting hole 5 formed in the mounting wall 3 in the mounting-target member, and the plurality of elastic gripping pieces 15 and the pair of elastic locking pieces 20 are pushed into the mounting hole 5. Then, the elastic locking pieces 20 are pressed against by the inner circumference of the mounting hole and are then pushed into the mounting hole while being deformed inwards, and the plurality of elastic gripping pieces 15, the support walls 18 and the ribs 19 are also inserted into the mounting hole. When the respective locking step portions 20a of the elastic locking pieces 20 come out of the mounting hole 5 to the rear side thereof, the elastic locking pieces 20 are elastically restored, whereby the locking step portions 20a are brought into engagement with the circumferential edge on the rear side of the mounting hole 5, and the pair of pressing pieces 22, 22 are brought into elastic abutment with the circumferential edge on the front side of the mounting hole 5. Then, as is shown in FIG. 3A, the base plate 10 is installed in the mounting hole 5 without any looseness, whereby the temperature sensor 7 is mounted inside the mounting wall 3.

In this embodiment, since the pair of support walls 18, 18 are brought into abutment with the longitudinal ends of the mounting hole 5, the base plate 10 can be installed firmly without any looseness relative to the mounting hole 5. Further, since axial end portions of the temperature sensor are supported by the ribs 19 that extends from the support walls 18 and that is disposed outside the elastic gripping pieces 15 (refer to FIG. 2C), and since the rib 19 being brought into abutment with the inner circumference of the longer side of the mounting hole 5 which extends along the longitudinal direction thereof, the temperature sensor 7 is supported firmly, whereby the inclination of the temperature sensor 7 can be prevented effectively.

In the mounting unit 1 of this embodiment, as is shown in FIG. 3B, the plurality of elastic gripping portions 15 are inserted into the mounting hole 5 when the plurality of elastic locking pieces 20 are brought into engagement with the circumferential edge on the rear side of the mounting hole 5, whereby the outer surfaces of the elastic gripping pieces 15 which lie in the deforming direction thereof are made to be brought into abutment with the inner circumference of the mounting hole 5. As a result, the outward deformation of the plurality of elastic gripping pieces 15 is restricted.

Consequently, even though the position of the temperature sensor 7 is caused to deviate from its normal position by the lead wires 7a of the temperature sensor 7 being pulled or the like, causing the elastic gripping pieces 15 to be pressed from inside thereof, since the outward deformation of the elastic gripping pieces 15 is restricted, the temperature sensor 7 is held to be gripped by the plurality of elastic gripping pieces 15, whereby the dislocation of the temperature sensor 7 from the rear surface of the base plate 10 is surely prevented, and hence, the temperature sensor 7 can be firmly held on the rear surface of the base plate 10. As a result, the temperature sensor 7 can be mounted firmly inside the mounting-target member (not shown) at the mounting wall 3 thereof.

In this mounting unit 1, for example, the temperature sensor 7 does not have to be secured to the base plate 10 with a resin or the like. Since the temperature sensor 7 can be mounted on the mounting hole 5 simply by pushing the temperature sensor 7 into the mounting hole 5 in a state where the temperature sensor 7 has been gripped by the plurality of elastic gripping pieces 15, the efficiency of the temperature sensor mounting work can be enhanced.

The outer surfaces of the elastic gripping pieces 15, which lie in the deforming direction thereof, may not come in abutment with the inner circumference of the mounting hole 5 during the elastic gripping pieces 15 are inserted into the mounting hole 5. In this case, the elastic gripping pieces 15 may be configured to abut the inner circumference of the mounting hole 5 only when the external force is exerted thereon, thereby keeping such a state that the minimum width W of the adjacent pressing claws 16 is smaller than the outside diameter D of the temperature sensor as viewed form the axial direction the temperature sensor 7.

In this embodiment, the elastic gripping pieces 15 are disposed in two rows on both the longitudinal sides of the temperature sensor 7 along the longitudinal direction thereof. As a result, since the temperature sensor 7 is gripped between the two longitudinal rows of the elastic gripping pieces 15, the temperature sensor 7 can be held more firmly.

In this embodiment, the plurality of gripping pieces 15 are disposed in the rows on both the sides along the longitudinal direction of the temperature sensor 7 in such a manner as to be arranged in the zigzag fashion so as not to overlap each other in the width direction or not to face the elastic gripping pieces on the opposite row. Since the temperature sensor 7 is gripped between the gripping pieces 15 therebetween so that the gripping force is not concentrated to the particular portion but is dispersed, the breakage or the like of the temperature sensor 7 can be suppressed.

Figure 4:
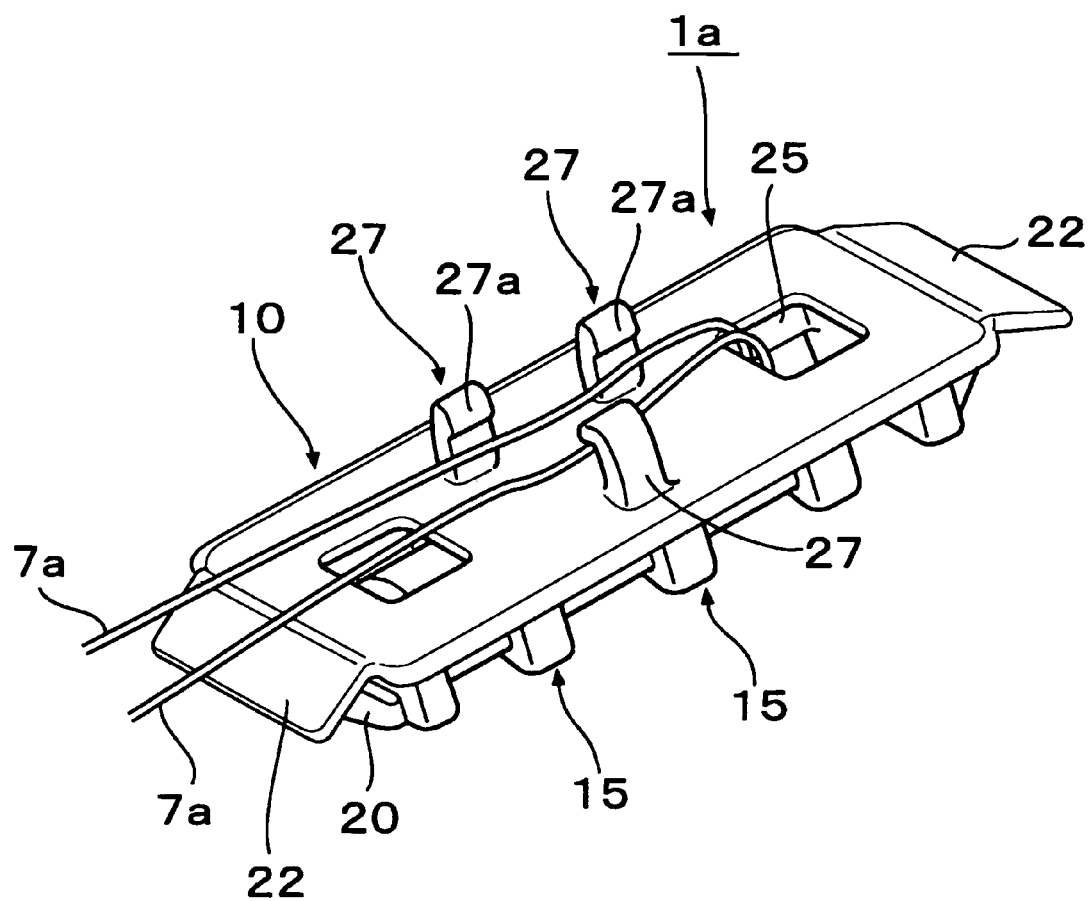
FIG. 4 is a perspective view showing a temperature sensor mounting unit according to another embodiment of the invention.

FIG. 4 shows a temperature sensor mounting unit according another embodiment of the invention. Like reference numerals will be given to substantially like portions to those of the embodiment above, and the description thereof will be omitted here.

As is shown in the same figure, a temperature sensor mounting unit 1a (hereinafter, referred to as a "mounting unit 1a") of this embodiment has a plurality of guide pieces 27 which are provided on a front surface side of a base plate 10 for guiding lead wires 7a of a temperature sensor 7 which are lead out of a passage hole 25 in a given direction.

In this embodiment, a plurality of elastic gripping pieces 15 are disposed in two rows on a rear side of the base plate, and the plurality of guide pieces 27 are disposed in two rows along the disposing direction of the elastic gripping pieces on the front side of the base plate 10. Namely, the elastic gripping pieces 15 and the guide pieces 27 are made to respectively deform in the same direction. A hooking claw 27a is provided on distal end of each guide piece 27 to inwardly project, thereby hooking the lead wires 7a thereon when the lead wires 7a come out from inside the guide pieces 27.

How to use the mounting unit 1a for this embodiment is the same as that for the previous embodiment. Namely, the lead wires 7a of the temperature sensor 7 are lead out of the passage hole 25 in the base plate 10 in advance. As this occurs, in this embodiment, since the plurality of guide pieces 27 are disposed on the front side of the base plate 10, the lead wires 7a can be guided in the given direction by setting the lead wires 7a inside the guide pieces 27 in advance. As a result, when the base plate 10 is pushed into the mounting hole 5 to mount the temperature sensor 7 therein, the interference of the lead wires 7a of the temperature sensor 7 with other members existing around the mounting hole can be prevented, thereby enhancing the efficiency of the mounting work of the temperature sensor 7.

In addition, the guide pieces 27 are disposed along the direction in which the elastic gripping pieces 15 are disposed, and the lead wires 7a are disposed in the direction perpendicular to the deforming direction of the elastic gripping pieces 15. As a result, even though the temperature sensor 7 is pulled via the lead wires 7a prior to being mounted into the mounting hole 5, since the temperature sensor 7 is only caused to move in the direction perpendicular to the deforming direction of the elastic gripping pieces 15, the temperature sensor 7 can be held temporarily in a stable posture.

While in the embodiments described heretofore, the temperature sensor 7 is described as being mounted on the mounting wall 3 which configures the external casing of the battery, the temperature sensor 7 may be mounted on a circumferential wall (a mounting wall) of an exhaust pipe (a mounting-target member) to measure the temperature of exhaust gases which are discharged form the internal combustion engine or the temperature sensor 7 may be mounted on a circumferential wall (a mounting wall) of a coolant supply pipe (a mounting-target member) to measure the temperature of a coolant which is supplied to the internal combustion engine, thus, there being imposed no specific limitation on the location where the temperature sensor is to be mounted by the use of the mounting unit of the invention.

According to an aspect of the present invention, there is provided a temperature sensor mounting unit to mount the temperature sensor in the mounting hole, by inserting the temperature sensor between the plurality of elastic gripping pieces and by pushing the temperature sensor so gripped into the mounting hole, thereby enhancing the efficiency of temperature sensor mounting work.

After the temperature sensor has been mounted in the mounting hole, when the external force is exerted on the elastic gripping pieces, attempting to expand the elastic gripping pieces, the outer surfaces of the elastic gripping pieces which lie in the deforming direction of the elastic gripping pieces are brought into abutment with the inner circumference of the mounting hole, thereby restricting the expansion of the elastic gripping pieces. Consequently, even though the lead wire is pulled, the temperature sensor can be surely gripped by the elastic gripping pieces and firmly held in place.

What is claimed is:

1. A temperature sensor mounting unit for mounting a temperature sensor inside a mounting-target member through a mounting hole provided in a mounting wall, the temperature sensor mounting unit comprising:
   a base plate that is to be mounted on the mounting hole from a front side of the mounting wall;
   a plurality of elastic gripping pieces that extend from the base plate to grip the temperature sensor therebetween and to be inserted into the mounting hole;

a plurality of elastic locking pieces formed on the base plate to be brought into engagement with the mounting hole form a back side of the mounting wall; and a passage hole formed on the base plate to lead out a lead wire of the temperature sensor therethrough, wherein, in a state where the elastic locking pieces have been engaged with the mounting hole and where the elastic gripping pieces are inserted into the mounting hole, at least when an external force to expand the elastic gripping pieces is exerted, the elastic gripping pieces are brought into abutment with an inner circumference of the mounting hole so as to be prevented from expanding.

2. The temperature sensor mounting unit according to claim 1, wherein the temperature sensor has a rod shape, and wherein the elastic gripping pieces are arranged in two rows each aligned in an extending direction of the rod-shaped temperature sensor.

3. The temperature sensor mounting unit according to claim 2, wherein the two rows of the elastic gripping pieces are arranged in zigzag along the extending direction of the rod-shaped temperature sensor.

4. The temperature sensor mounting unit according to claim 2, wherein the base plate has a plate shape extending along the extending direction of the rod-shaped temperature sensor, wherein a pair of support walls are provided at both ends of the base plate in an extending direction thereof to have a width matching to the mounting hole, and wherein the elastic locking pieces are provided on the base plate via the support walls, respectively.

5. The temperature sensor mounting unit according to claim 1, wherein a plurality of guide pieces are provided on the base plate at an opposite side of the elastic gripping pieces, and wherein the guide pieces guide the lead wire that has been lead out through the passage hole in a given direction.

6. The temperature sensor mounting unit according to claim 5, wherein the guide pieces are arranged along the extending direction of the rod-shaped temperature sensor.

* * * * *